(12) United States Patent
Uezono et al.

(10) Patent No.: US 10,339,242 B2
(45) Date of Patent: Jul. 2, 2019

(54) SEMICONDUCTOR LSI DESIGN DEVICE AND DESIGN METHOD

(71) Applicant: Hitachi, Ltd., Chiyoda-ku, Tokyo (JP)

(72) Inventors: Takumi Uezono, Tokyo (JP); Tadanobu Toba, Tokyo (JP); Yusuke Kanno, Tokyo (JP); Masahiro Shiraishi, Tokyo (JP); Hideo Harada, Tokyo (JP); Satoshi Nishikawa, Tokyo (JP); Toru Motoya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 15/622,805

(22) Filed: Jun. 14, 2017

(65) Prior Publication Data

US 2017/0364610 A1  Dec. 21, 2017

(30) Foreign Application Priority Data

Jun. 15, 2016 (JP) .................................. 2016-118531

(51) Int. Cl.
G06F 17/50 (2006.01)

(52) U.S. Cl.
CPC ........ G06F 17/505 (2013.01); G06F 17/5054 (2013.01); *G06F 17/5022* (2013.01); *G06F 17/5045* (2013.01); *G06F 17/5081* (2013.01); *G06F 2217/02* (2013.01); *G06F 2217/66* (2013.01)

(58) Field of Classification Search
None
See application file for complete search history.

(56) References Cited

U.S. PATENT DOCUMENTS 7,284,218 B1 * 10/2007 Roy ..................... G06F 17/5022
                                                                703/14
7,454,727 B1 * 11/2008 Cerny ................... G06F 17/504
                                                                703/16

(Continued)

FOREIGN PATENT DOCUMENTS

JP      4371856 B2    11/2009

OTHER PUBLICATIONS

R. K. Brayton et al., "VIS: A System for Verification and Synthesis," Eight Conference on Computer Aided Verification (CAV'96), LNCS 1102, pp. 428-432, Jun. 1996. (Year: 1996).*

(Continued)

*Primary Examiner* — Leigh M Garbowski
(74) *Attorney, Agent, or Firm* — Crowell & Moring LLP (57) ABSTRACT

Provided is a technology capable of reducing the number of resources necessary for logic implementation in a control device. A semiconductor LSI design device generates a combinational circuit configured with functional blocks defined by a functional block library from an application specification, allocates an operation order of each functional block in the combinational circuit under a condition for starting an operation of a functional block connected to an input pin after ending the operation, converts into a sequence circuit which uses the functional block twice or more in a time division manner, extracts the operation order at a time of execution of the sequential circuit, and determines whether the operation order allocated to the combinational circuit coincides with the extracted operation execution order.

9 Claims, 9 Drawing Sheets

(56) References Cited

U.S. PATENT DOCUMENTS

| | | |
|---|---|---|
| 7,774,187 B2 | 8/2010 | Izumi et al. |
| 8,352,505 B1 | 1/2013 | Venkataramani et al. |
| 2007/0067751 A1 | 3/2007 | Seno |

OTHER PUBLICATIONS

A. A. Mir et al., "Modeling and Verification of Embedded Systems Using Cadence SMV," 2000 IEEE 5 pages. (Year: 2000).*
I.-H Moon et al., "A Compositional Approach to the Combination of Combinational and sequential Equivalence Checking of Circuits Without Known Reset States," 2007 EDAA, 6 pages. (Year: 2007).*
J. Yoo et al., "A Verification Framework for FBD based Software in Nuclear Power Plants," 2008 15th Asia-Pacific Software Engineering Conference, pp. 385-392. (Year: 2008).*
J. Yoo et al., "Formal Modeling and Verification of Safety-Critical Software," IEEE Software, May/Jun. 2009, pp. 42-49. (Year: 2009).*
Kaeslin, "From Algorithms to Architectures", Digital Integrated Circuit Design-Chapter 2, Jan. 1, 2008, pp. 44-135, Cambridge University Press, New York, United States, XP055419008.
European Search Report issued in counterpart Application No. 17174833.8 dated Nov. 15, 2017 (ten (10) pages).
European Office Action issued in counterpart European Application No. 17174833.8 dated Sep. 3, 2018 (six (6) pages).
Kaestlin, "Digital Integrated Circuit Design: From VLSI Architectures to CMOS Fabrication"—Chapter 3, Functional Verification, 2008, pp. 136-174, Cambridge University Press, XP055501693 (44 pages).

\* cited by examiner

| BLOCK ID | OPERATION ORDER | BLOCK TYPE | CONNECTION INFORMATION ||
|---|---|---|---|---|
| | | | INPUT | OUTPUT |
| 1 (21) | 1 | A | W01,W02 | W03,W04 |
| 2 (22) | 2 | B | W03,W06 | W05 |
| 3 (23) | 3 | C | W04,W05 | W07,W09 |
| 4 (24) | 4 | B | W07,W08 | W10 |
| ... | ... | ... | ... | ... |

SEMICONDUCTOR LSI DESIGN DEVICE AND DESIGN METHOD

CLAIM OF PRIORITY

The present application claims priority from Japanese application serial no. JP2016-118531, filed on Jun. 15, 2016, the content of which is hereby incorporated by reference into this application.

BACKGROUND OF THE INVENTION

1. Field of the Invention

The present invention relates to a semiconductor LSI design device and designing method used for control devices in which high safety is required.

2. Description of the Related Art

In nuclear power plants, a safety protection system is installed to perform control such as emergency nuclear reactor shutdown, shutoff of various valves for preventing leakage of radioactive materials, and the like on the basis of an input from a radiation measurement device or various other sensors.

In the past, a microcomputer has been used as a control device, but when the same software is used for a redundant system by device multiplexing, there is a possibility of a device multiplexing function being damaged due to a defect of software. Further, when a memory cell of a storage device is irradiated with radiation such as cosmic rays, a phenomenon called a soft error in which charges are lost and data is rewritten is likely to occur, leading to an accidental abnormal operation. In addition, there is a growing demand for tamper resistance such as software rewrite prevention.

For this reason, in a control device of a nuclear power plant or the like in which high safety is required, a processor-less hardwired system is required for the purpose of improving security.

A background art is disclosed in Japanese Patent No. 4371856 (patent document 1).

"An safety instrumentation system of a nuclear reactor constructed using a digital logic mounted on hardware selected from an ASIC and an FPGA, including a digital logic portion which is configured using at least one of a functional unit which is verified in advance at a stage before output logical patterns with respect to all input logical patterns are mounted and a functional module constituted by combining the verified functional units, wherein the functional module is configured only with functional units having the same logical configuration as the verified functional units" is disclosed in patent document 1.

SUMMARY OF THE INVENTION

In order to improve security in the control device of the nuclear power plant and respond to the demand for the processor-less hardwired system, a safety protection instrumentation system configured with a highly reliable digital signal processing device and a handling method thereof are described in Patent Document 1. However, a reduction in the number of resources to be used when it is mounted on an ASIC or an FPGA is not taken into consideration.

For example, in order to construct a high safety control device, a flash type FPGA with high soft error resistance is considered to be used as the FPGA, but the flash type FPGA has a problem in that a logical scale that can be mounted is generally smaller than an SRAM type FPGA.

As another example, when an inexpensive FPGA is employed for cost reduction, a logical scale that can be mounted on one FPGA is small. For this reason, a control logic is unable to be mounted one FPGA but mounted over a plurality of chips, resulting in problems such as a complicated logic and a high verification cost.

Therefore, the number of resources used by devices such as FPGAs is an important factor in implementing a high safety control device.

In this regard, it is an object of the present invention to provide a technology capable of reducing the number of resources necessary for logic implementation of the control device.

In order to solve the above problems, provided is a semiconductor LSI design device of the present invention including a unit that generates a combinational circuit configured by combining functional blocks defined by a functional block library from an application specification, a unit that allocates an operation order of each functional block in the combinational circuit under a condition for starting an operation of a functional block connected to an input pin after ending the operation, a unit that converts the combinational circuit into a sequence circuit which uses the functional block twice or more in a time division manner, a unit that extracts the operation order at a time of execution of the sequential circuit, and a unit that determines whether the operation order allocated to the combinational circuit coincide with the extracted operation order.

Further, in order to solve the above problems, provided is a semiconductor LSI design device of the present invention including a unit that generates a combinational circuit configured by combining functional blocks defined by a functional block library from an application specification, a unit that allocates an operation order of each functional block in the combinational circuit under a condition for starting an operation of a functional block connected to an input pin after ending the operation, a unit that converts the combinational circuit into a sequence circuit which uses the functional block twice or more in a time division manner, and a unit that determines equivalence between the combinational circuit and the sequential circuit.

As another feature of the present invention, in the semiconductor LSI design device, the unit that converts the combinational circuit into the sequence circuit which uses the functional block twice or more in a time division manner includes a unit that converts the combinational circuit into a sequence circuit, the sequence circuit including: an operation order storage unit that stores the operation order generated by the unit that allocates the operation order of the functional block; a functional block group including functional blocks used in at least the combinational circuit connected in parallel, each functional block corresponding to each type; a memory that sequentially stores input data and operation results by the functional block; a memory control unit that reads data stored in the memory as an input to the functional block; an input selector that selects the read data as an input to the functional block group; an output selector that selects an operation result of the functional block group and storing the selected operation result in the memory; and an operation execution control unit that controls the memory control unit, the input selector, and the output selector in accordance with the operation order.

Further, in order to solve the above problems, provided is a semiconductor LSI design method including a step of generating a combinational circuit configured by combining functional blocks defined by a functional block library from an application specification, a step of allocating an operation order of each functional block in the combinational circuit under a condition for starting an operation of a functional block connected to an input pin after ending the operation, a step of converting the combinational circuit into a sequence circuit which uses the functional block twice or more in a time division manner, a step of extracting the operation order at a time of execution of the sequential circuit, and a step of determining whether the operation order allocated to the combinational circuit coincide with the extracted operation order.

According to the present invention, it is possible to reduce the number of resources necessary for logic implementation of the control device.

Problems, configurations, and effects which are not mentioned above will be apparent by description of an embodiment to be described below.

DESCRIPTION OF THE PREFERRED EMBODIMENTS

Hereinafter, exemplary embodiments will be described with reference to the appended drawings.

[First Embodiment]

Figure 1:
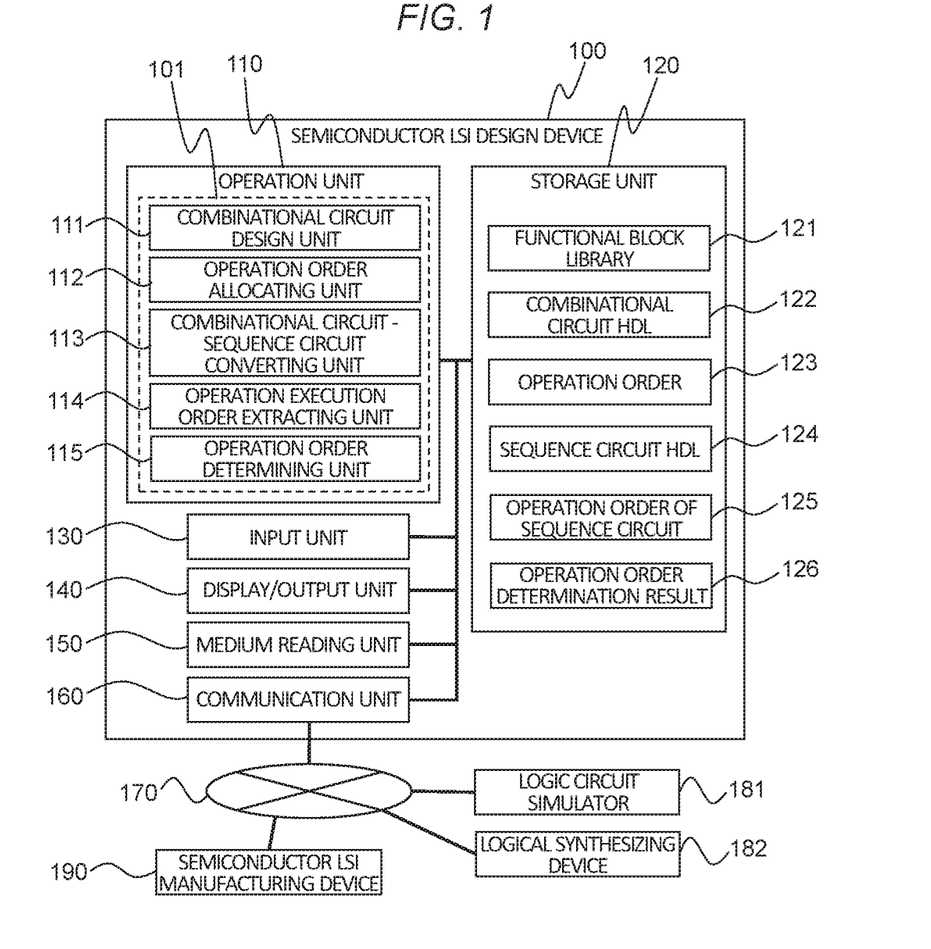
FIG. 1 is an example of a configuration diagram of a semiconductor LSI design device according to a first embodiment of the present invention.

FIG. 1 is an example of a configuration diagram of a semiconductor LSI design device 100 of this embodiment.

The semiconductor LSI design device 100 can be configured on a general-purpose computer and has a hardware configuration including an operation unit 110 configured with a central processing unit (CPU), a random access memory (RAM), and the like, a storage unit 120 configured with a read only memory (ROM), a hard disk drive (HDD), a solid state drive (SSD) using a flash memory, or the like, an input unit 130 configured with an input device such as a keyboard or a mouse, a display/output unit 140 configured with a display device such as a CRT display, an liquid crystal display (LCD), or an organic EL display, various kinds of output devices, or the like, a medium reading unit 150 that reading out information of a portable storage medium having portability such as a CD-ROM or a USB memory, a communication unit 160 configured with a network interface card (NIC) or the like, and the like.

The communication unit 160 is connected to an external logic circuit simulator 181, a logical synthesizing device 182, and a semiconductor LSI manufacturing device 190 via a network 170.

The operation unit 110 implements a control circuit design unit 101 including the following functional units by loading a control circuit design program (not illustrated) stored in the storage unit 120 onto the RAM and executes the control circuit design program through the CPU. The control circuit design unit 101 includes a combinational circuit design unit 111 that provides a user interface to a control circuit designer (user) and supports a design of a combinational circuit 10 of a functional block by the control circuit designer (user), an operation order allocating unit 112 that extracts and outputs operation order information 50 of each functional block in the combinational circuit HDL 10 output from the combinational circuit design unit, a combinational circuit-sequence circuit converting unit 113 that performs conversion into a sequence circuit that executes a functional block operation in accordance with the operation order information 50, and outputs a sequence circuit HDL 60, an operation execution order extracting unit 114 that extracts an operation order 70 of the sequence circuit HDL 60, and an operation order determining unit 115 that determines that the operation order information 50 output from the operation order allocating unit 112 is equivalent to the operation order 70 of the sequence circuit HDL 60 output from the operation execution order extracting unit 114, and outputs an operation order determination result 80.

The storage unit 120 has a functional block library 121 in which various kinds of functional blocks which are commonly used by control circuits of a plurality of applications are registered. The functional blocks are logical operations, four arithmetic operations, an integral operation and have various circuit sizes, but the functional block has a logic scale capable of checking that all output patterns with respect to all input patterns to the functional block are equivalent to patterns of predicted values expected from a design specification. Each functional block is a verified HDL library which is verified in advance through verification, dynamic verification, or the like and registered.

The storage unit 120 further includes a combinational circuit HDL storage region 122 that stores the combinational circuit HDL 10 output from the combinational circuit design unit 111, an operation order storage region 123 that stores the operation order information 50 output from the operation order allocating unit 112, a sequence circuit HDL storage region 124 that stores the sequence circuit HDL 60 output from the combinational circuit-sequence circuit converting unit 113, an operation order storage region 125 of the sequence circuit that stores the operation order 70 of the sequence circuit HDL 60 output from the operation execution order extracting unit 114, and an operation order determination result storage region 126 that stores the operation order determination result 80 output from the operation order determining unit 115.

Figure 2:
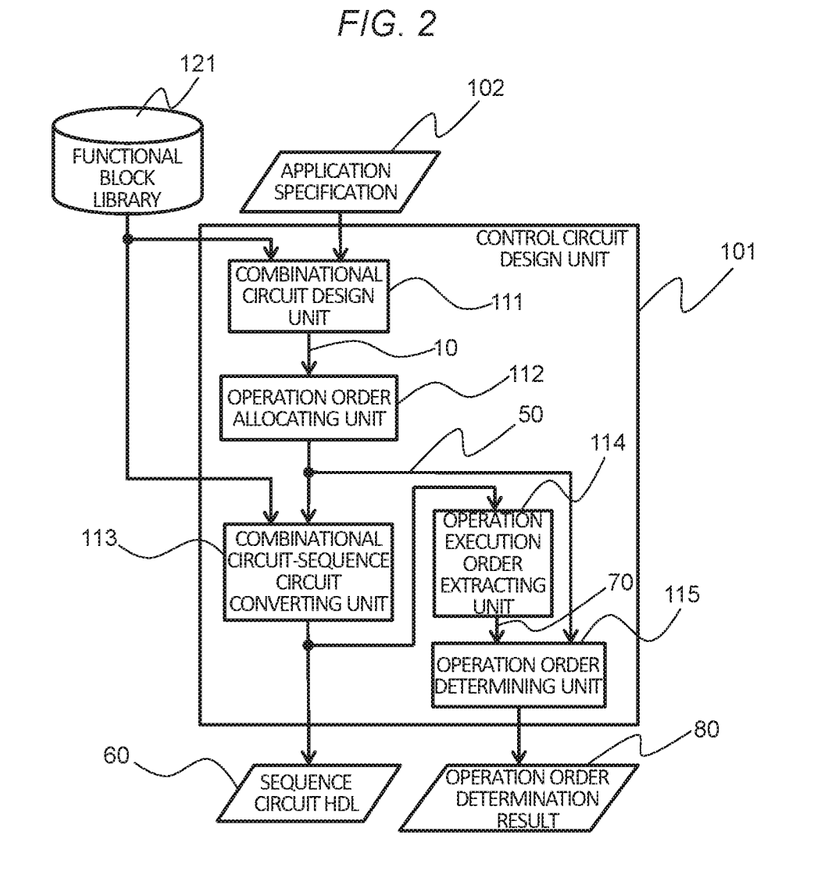
FIG. 2 is an example of a flowchart of a process in a control circuit design unit according to the first embodiment of the present invention.

FIG. 2 illustrates a flowchart of a process in the control circuit design unit 101.

The combinational circuit design unit 111 presents a user interface to the display/output unit 140, and receives control circuits that are input in a hardware description language format or an input format in which diagrams indicating the functional blocks are arranged on the basis of an application specification 102, from the input unit 130 by the control circuit designer (user), and generates the combinational circuit. The combinational circuit design unit 111 presents a menu of the functional blocks registered in the functional block library 121, and the control circuit designer (user) designs a combinational circuit of implementing the application specification 102 by freely arranging the functional blocks in the menu, wiring the arranged functional blocks, adding input/output pins. The combinational circuit design unit 111 outputs the combinational circuit HDL 10 of a HDL format and stores the combinational circuit HDL 10 of the HDL format in the combinational circuit HDL storage region 122.

Figure 3:
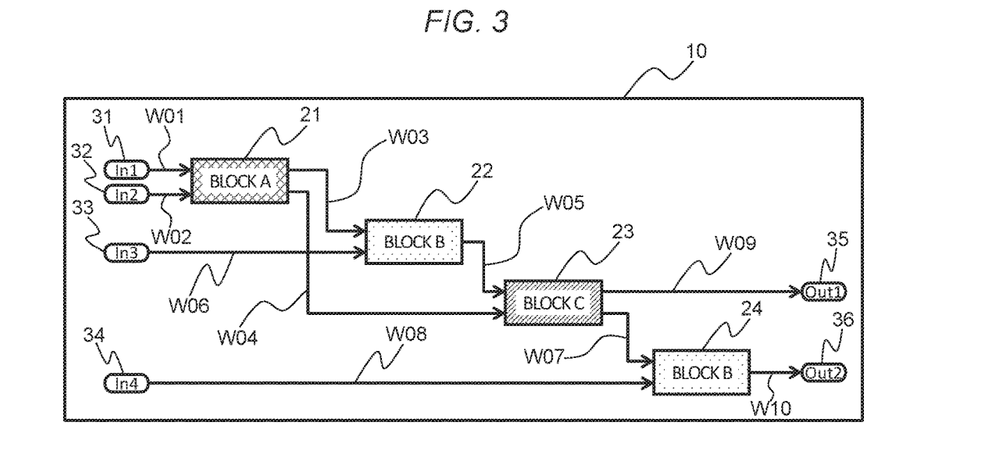
FIG. 3 is an example of a block diagram of a combinational circuit HDL output from a combinational circuit design unit according to the first embodiment of the present invention.

FIG. 3 is an example of a block diagram of the combinational circuit HDL 10 output from the combinational circuit design unit 111. In an example of FIG. 3, a 4-input 2-output application is implemented by arranging four functional blocks (21 to 24) side by side, arranging input pins (31 to 34) and output pins (35 to 36), and connecting the functional blocks 21 to 24 and the functional blocks and the input/output pins by wirings (W01 to W10).

The operation order allocating unit 112 illustrated in FIG. 2 allocates an operation order to each functional block on the basis of a constraint condition to be described below in the combinational circuit HDL 10 created by the combinational circuit design unit 111. The constraint condition is a condition that an "operation order of a certain functional block X is later than operation orders of all functional blocks connected to the input pin of the functional block X".

Figure 4:
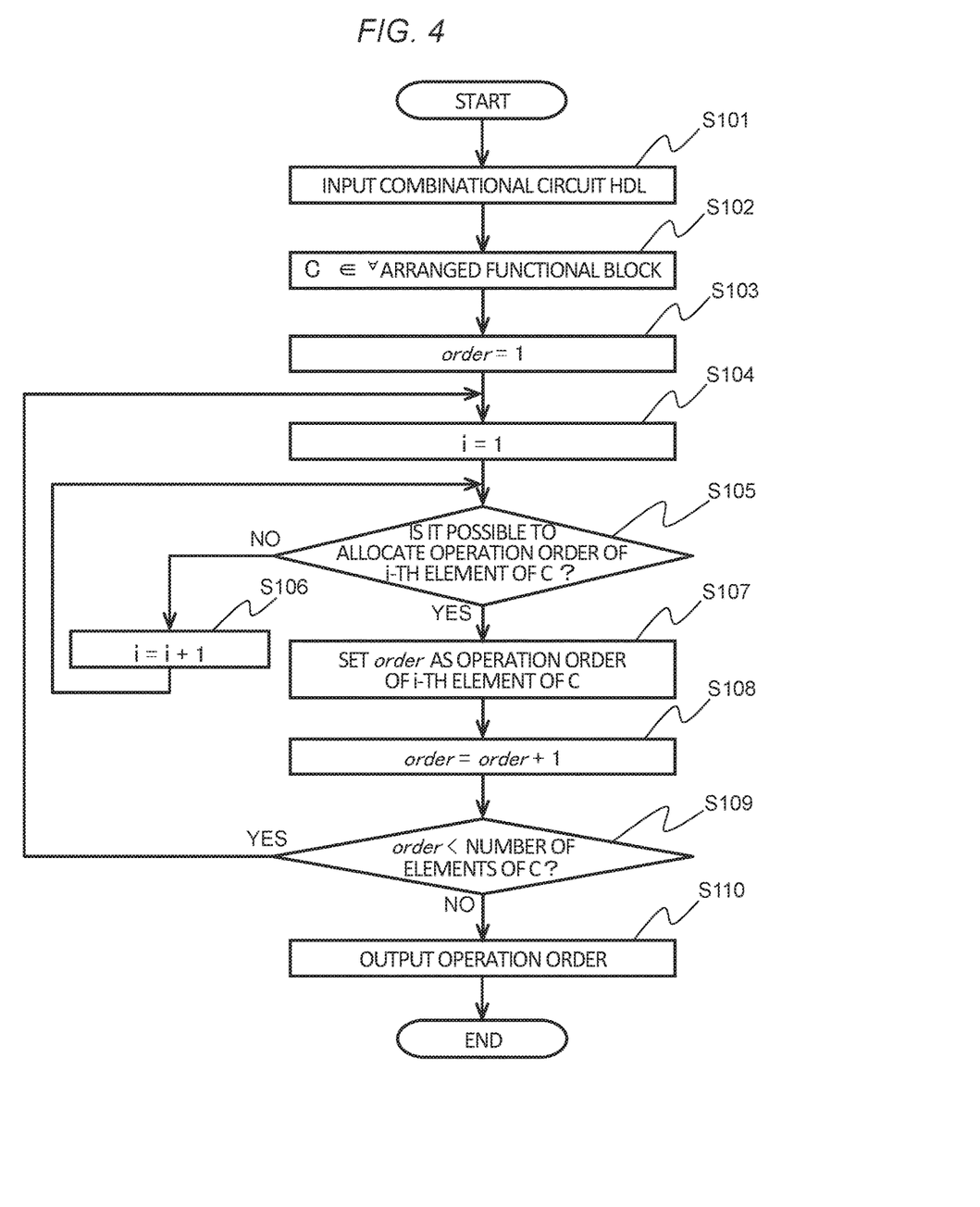
FIG. 4 is an example of a flowchart of an operation order allocating unit according to the first embodiment of the present invention.

FIG. 4 is a flowchart illustrating an example of the process of the operation order allocating unit 112. An operation based on the flowchart of FIG. 4 is as follows.

Step S101: The combinational circuit HDL 10 created by the combinational circuit design unit 111 is read.

Step S102: Arranged functional block information in the combinational circuit HDL 10 is collected as data C. For example, a set such as C={"Block A," "Block B," "Block C," "Block B"}.

Step S103: A variable "order" indicating an operation order to be allocated is initialized to 1.

Step S104: A variable i indicating the functional block in the data C to which the operation order is allocated is initialized to 1.

Step S105: It is determined whether or not it is possible to allocate the operation order of the functional block indicated by the variable i. Further, instead of allocating the operation order to the functional block indicated by the variable i, it is determined that it is possible to allocate the operation order when the operation order is allocated to all the functional blocks connected to the input pin of the corresponding functional block.

Step S106: 1 is added to the variable i, and the process proceeds to a next functional block.

Step S107: The operation order is allocated to the functional block indicated by the variable i. The variable "order" is used as a value to be allocated.

Step S108: 1 is added to the variable "order," and the operation order to be allocated is changed.

Step S109: To determine whether or not the operation order is allocated to all the functional blocks, the variable "order" is compared with the number of elements of C. For example, when the variable "order" is smaller than the number of elements of C, it is determined that there is a function block to which the operation order is not allocated.

Step S110: The allocated operation order is generated in in the form of an operation order information 50 table illustrated in FIG. 5 and outputted. A block ID field 50a of the operation order information table indicates a value of the variable i indicating the functional block, an operation order field 50b indicates an allocated operation order, a block type field 50c indicates data of a type identifying a functional block registered in the functional block library, an input field 50d of connection information indicates code data identifying a wiring connected to the input pin of the corresponding functional block, and an output field 50e of the connection information indicates code data identifying a wiring connected to the output pin of the corresponding functional block. The operation order information table in FIG. 5 stores an example of the combinational circuit HDL 10 illustrated in FIG. 3. The operation order allocating unit 112 stores the operation order information 50 in the operation order storage region 123.

The flowchart of FIG. 4 is an example of a method of implementing the operation order allocating unit 112, and for example, the designer may allocate the operation order.

The combinational circuit-sequence circuit converting unit 113 illustrated in FIG. 2 receives the combinational circuit HDL 10 outputted from the combinational circuit design unit 111 and the operation order information 50 outputted from the operation order allocating unit 112, and generates the sequence circuit HDL 60 with reference to the functional block library 121. A format for converting the combinational circuit HDL to the sequence circuit HDL is illustrated in FIG. 6.

Figure 6:
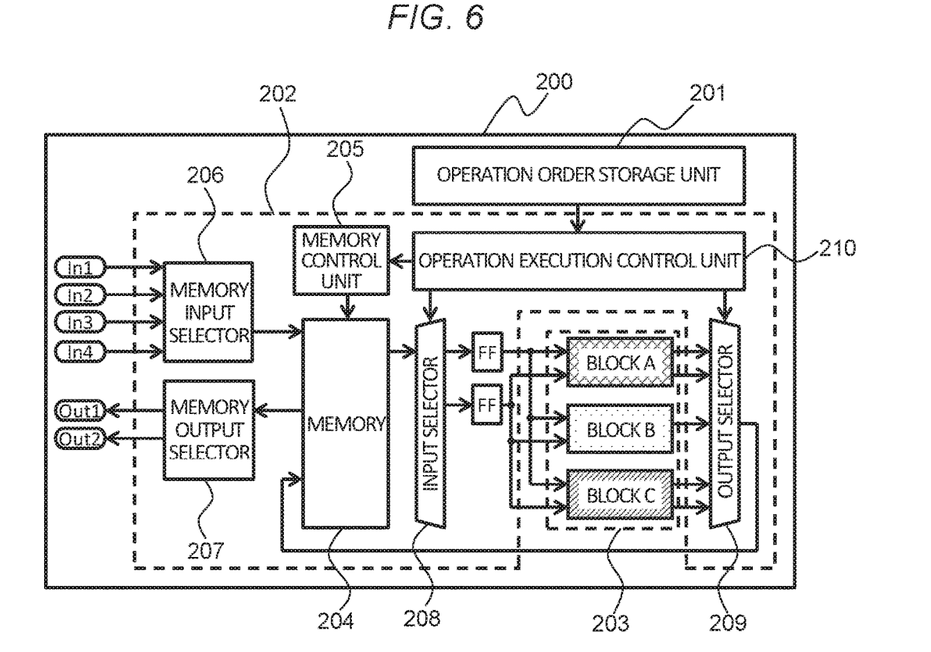
FIG. 6 is an example of a sequence circuit generated by a combinational circuit-sequence circuit converting unit according to the first embodiment of the present invention.

FIG. 6 illustrates a configuration example (200) of the sequence circuit HDL 60 outputted from the combinational circuit-sequence circuit converting unit 113. The combinational circuit-sequence circuit converting unit 113 generates the sequence circuit of executing the operation of each functional block in accordance with the operation order information 50 allocated by the operation order allocating unit 112. The generated sequence circuit 200 is configured with an operation order storage unit 201, an operation control unit 202, and a functional block group 203.

Figure 5:
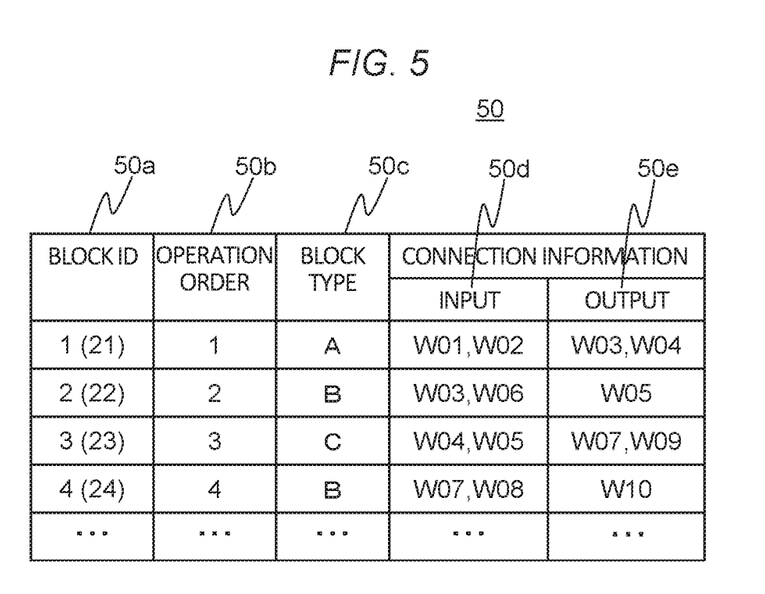
FIG. 5 is an example of an operation order information table generated by the operation order allocating unit according to the first embodiment of the present invention.

The operation order storage unit 201 stores data of the operation order field 50b, the block type field 50c, the connection information input field 50d, and the connection information output field 50e in the operation order information 50 illustrated in FIG. 5.

For example, the operation control unit 202 is configured with a memory 204, a memory control unit 205, a memory input selector 206, a memory output selector 207, an input selector 208, an output selector 209, and an operation execution control unit 210.

The functional block group 203 includes the functional blocks used in the combinational circuit HDL 10, the functional blocks are connected to the input selector 208 and the output selector 209 in parallel, and each functional block corresponds to each type.

The operation control unit 202 and the functional block are verified in advance.

An operation of the present sequence circuit 200 is as follows.

Operation 1: One piece of input data (In 1 to In 4) is selected by the memory input selector 206, and the selected data including the wiring (connection) information added thereto is stored in the memory 204 controlled by the memory control unit 205.

Operation 2: The operation execution control unit 210 acquires a block type to be executed next and the connection information (input and output) which are stored in the operation order storage unit 201 in accordance with the operation order.

Operation 3: The memory control unit 205 controls the memory 204 such that the input data is read from the memory 204 in accordance with the connection information. The read data passes through the input selector 208 and is sequentially stored in an FF. The input selector 208 is controlled by the operation execution control unit 210.

Operation 4: The operation of each functional block is executed by the functional block group 203.

Operation 5: The output selector 209 sequentially selects each output of the functional block whose operation is executed, adds the connection information, and sequentially stores the resulting information in the memory 204. The output selector 209 is controlled by the operation execution control unit 210.

Operation 6: Operations 2 to 5 are performed on all pieces of the data stored in the operation order storage unit 201.

Operation 7: Among the data stored in the memory 204, operation result data are sequentially read and output to each output port through the memory output selector 207.

FIG. 6 is an example of a circuit indicated by the sequence circuit HDL 60, and for example, the circuit may have a configuration in which the input data is written in the FF, and the memory 204 is not provided.

In the functional block group 203, all types of functional blocks included in the functional block library 121 may be mounted, or only the functional block to be determined to be used with reference to the operation order information 50 may be mounted.

The combinational circuit-sequence circuit converting unit 113 stores the generated sequence circuit HDL 60 in the sequence circuit HDL storage region 124.

The operation execution order extracting unit 114 illustrated in FIG. 2 analyzes the sequence circuit HDL 60 outputted from the combinational circuit-sequence circuit converting unit 113, and acquires the order in which the operations of the functional blocks of the functional block group 203 are performed. As a method of analyzing the sequence circuit HDL 60, for example, a HDL simulation is considered to be executed. In the example of FIG. 6, the HDL simulation of the sequence circuit 200 is executed to check the functional block whose output signal is selected by the output selector 209 and acquire the order in which the operations of the functional blocks are performed. Since the selection of the output selector is controlled in accordance with the control signal output from the operation execution control unit 210 to the output selector, the output signal of the operation execution control unit may be monitored to acquire the operation execution order.

In the example illustrated in FIG. 1, the process of the operation execution order extracting unit 114 may be calculated using a known logic circuit simulator 181 installed in an external computer, or a logic circuit simulator may be installed in the semiconductor LSI design device 100 and used. The operation order 70 of the sequence circuit HDL 60 which is analyzed and outputted by the operation execution order extracting unit 114 is stored in the operation order storage region 125 of the sequence circuit.

The operation order determining unit 115 illustrated in FIG. 2 determines that the operation order 70 of the sequence circuit HDL 60 analyzed by the operation execution order extracting unit 114 is equivalent to the operation order information 50 generated by the operation order allocating unit 112, and outputs it as the operation order determination result 80 and stores it in the operation order determination result storage region 126. When the operation order determination result 80 is "equivalent," the conversion of the combinational circuit-sequence circuit conversion is determined to have been performed correctly. It is because in the circuit components of FIG. 6, since the operation control unit 202 and the functional block group 203 have already been verified, an unverified circuit component is only the operation order storage unit 201, and thus when the operation order 70 of the sequence circuit HDL 60 is correct, the operation order storage unit 201 storing the operation execution order can be regarded as operating correctly.

When the operation order determination result 80 is "not equivalent," the process of storing the operation order information 50 created by the operation order allocating unit 112 in the operation order storage unit 201 is first doubted.

When the operation order determination result 80 is determined "equivalent," the sequence circuit HDL 60 stored in the sequence circuit HDL storage region 124 is transmitted to the logical synthesizing device 182, logical synthesis and arrangement wiring process are performed, and a sequence circuit netlist is generated. The sequence circuit netlist is transmitted to the semiconductor LSI manufacturing device 190 or the like and mounted on an ASIC or an FPGA.

A known logic circuit simulator or a known logical synthesizing tool may be mounted on the semiconductor LSI design device 100. In this case, a series of design processes are executed in the operation unit 110.

As described above, according to the present embodiment, a combinational circuit that executes a plurality of functional blocks of the same type is converted to a sequence circuit that uses one functional block as the same type of functional block twice or more in a time division manner multiple times, and thus the number of circuit use resources can be reduced. For example, in the case of an application in which 50 kinds of functional blocks are combined, and the functional block is used a total of 10,000 times, 10,000 functional blocks are arranged in the combinational circuit, but only 50 functional blocks are arranged in the sequence circuit. Therefore, the number of circuit use resources for implementing the functional blocks is 50/10000=1/200. In applications in which the functional blocks of implementing a complicated analog calculation are used, for example, in nuclear instrumentation, since the use resources of the functional blocks are dominant, the effect of reducing a total of the number of circuit use resources is increased, and it is possible to reduce a total of the number of circuit use resources to about 1/100 even though the use resources of the operation order storage unit and the operation control unit are considered. Accordingly, it is possible to implement the logic of the high safety control device using a small number of circuit resources.

[Second Embodiment]

Figure 7:
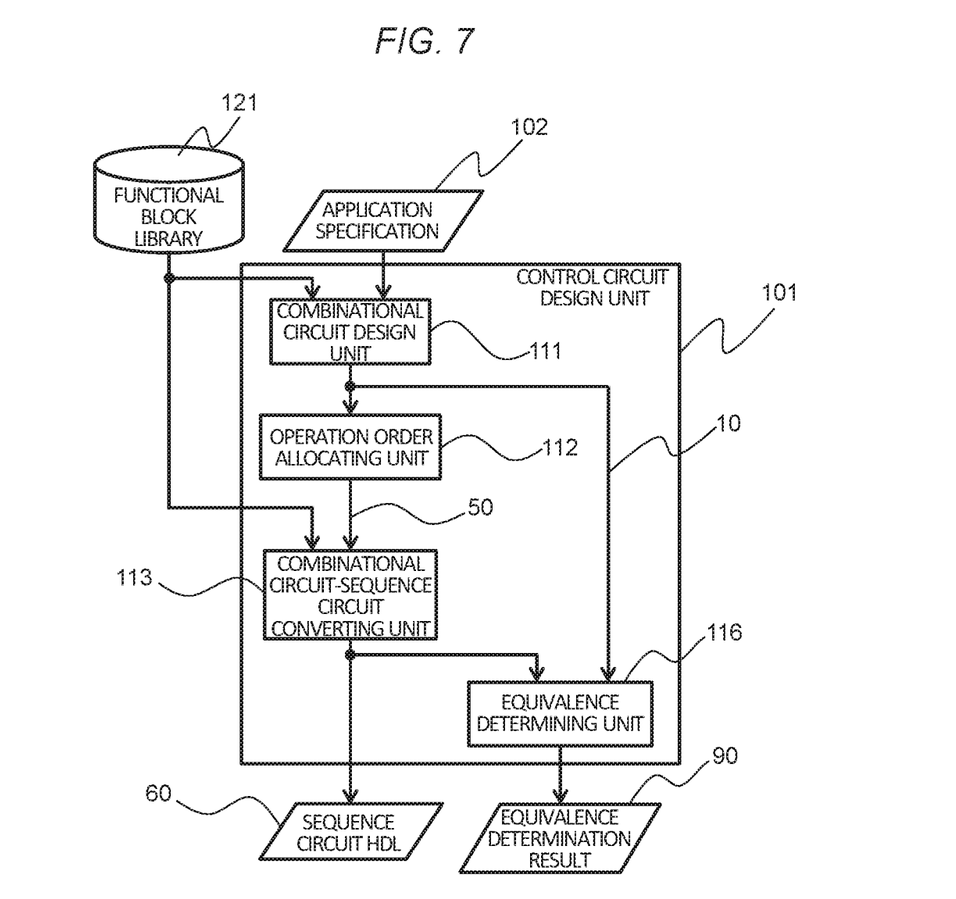
FIG. 7 is an example of a flowchart of a process in a control circuit design unit according to a second embodiment of the present invention.

FIG. 7 illustrates a second embodiment. The same components as those in FIG. 2 are denoted by the same reference numerals, and since their configurations and operations are the same, description thereof is omitted. In the present embodiment, in order to verify the validity of the sequence circuit HDL 60, instead of comparing the allocated operation order information 50 with the operation order 70 in the sequence circuit, equivalence between the combinational circuit HDL 10 and the sequence circuit HDL 60 is determined. The following description will proceed with differences with the first embodiment with reference to FIG. 7.

An equivalence determining unit 116 determines equivalence between the combinational circuit HDL 10 output from the combinational circuit design unit 111 and the sequence circuit HDL 60 output from the combinational circuit-sequence circuit converting unit 113, and outputs a determination result as an equivalence determination result 90. When the equivalence determination result 90 indicates "equivalent," the conversion of the combinational circuit-sequence circuit can be determined to have been performed correctly. As a method of determining the equivalence, for example, a method of applying the same input signal to the combinational circuit indicated by the combinational circuit HDL 10 and the sequence circuit indicated by the sequence circuit HDL 60 and comparing output signals of the respective circuits after a certain time. Referring to FIGS. 3 and 6 as an example, the same input signal is applied to In 1 to In 4 of each circuit, and Out 1 and Out 2 of each circuit are compared after a certain time. They are determined to be equivalent when comparison results for all input patterns are identical.

Through such a change, it is possible to verify that the operation results of the sequence circuit HDL 60 and the combinational circuit HDL 10 coincide with each other, and thus it is possible to verify the validity of the sequence circuit HDL 60 with a high degree of accuracy. Accordingly, it is possible to implement the logic of the high safety control device using a small number of circuit resources.

[Third Embodiment]

Figure 9:
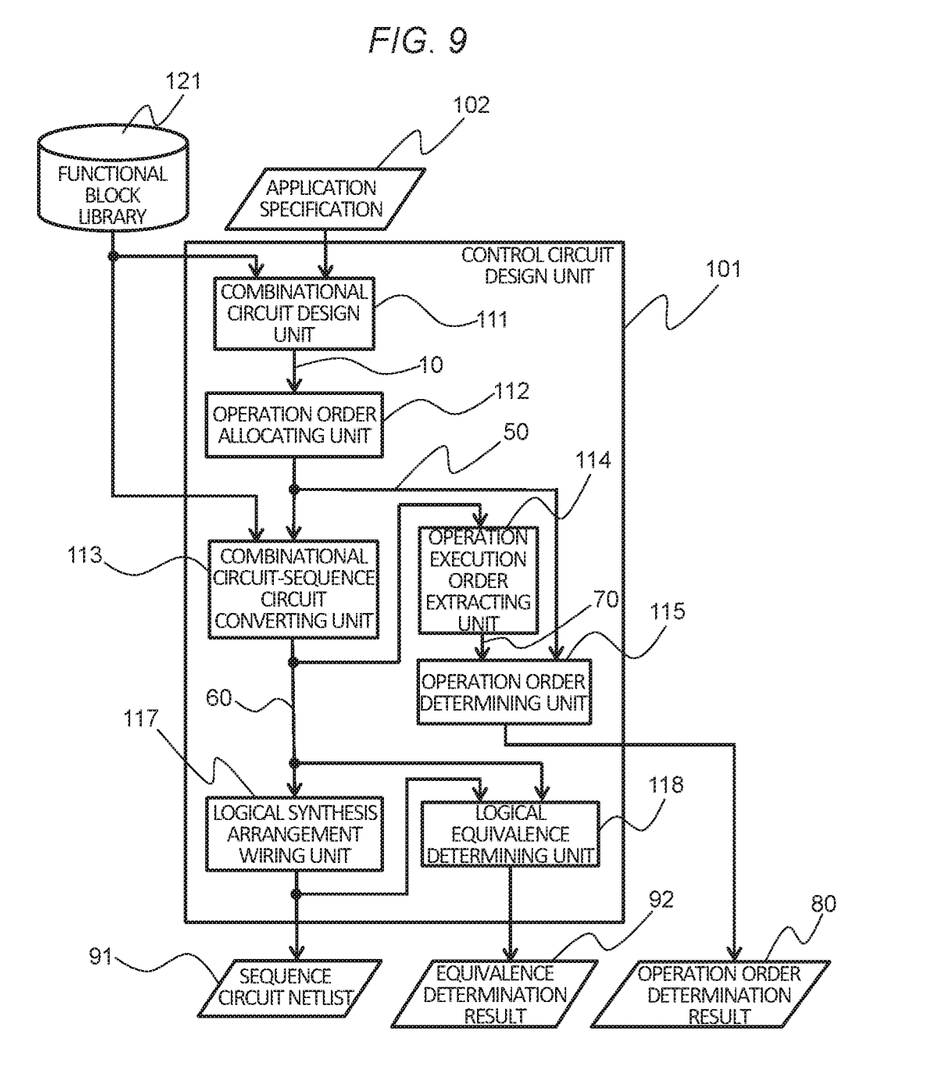
FIG. 9 is an example of a flowchart of a process in a control circuit design unit according to the third embodiment of the present invention.

FIG. 9 illustrates a third embodiment. The same components as those in FIG. 2 are denoted by the same reference numerals, and since their configurations and operations are the same, description thereof is omitted. A logical synthesis arrangement wiring unit 117 reads the sequence circuit HDL 60, performs logical synthesis and arrangement wiring for mounting it on ASIC or FPGA, and outputs a sequence circuit netlist 91. A logical equivalence determining unit 118 determines logical equivalence between the sequence circuit HDL 60 and the sequence circuit netlist 91. As a method of determining the logical equivalence, a similar method as that of the equivalence determining unit 116 is used.

Through such a change, it is possible to mount the sequence circuit having a small number of circuit use resources on an ASIC or FPGA. The validity of the sequence circuit can be determined by the operation order determining unit 115 and the logical equivalence determining unit 118. Accordingly, it is possible to implement the logic of the high safety control device using a small number of circuit resources and mount it on an ASIC or an FPGA.

Figure 8:
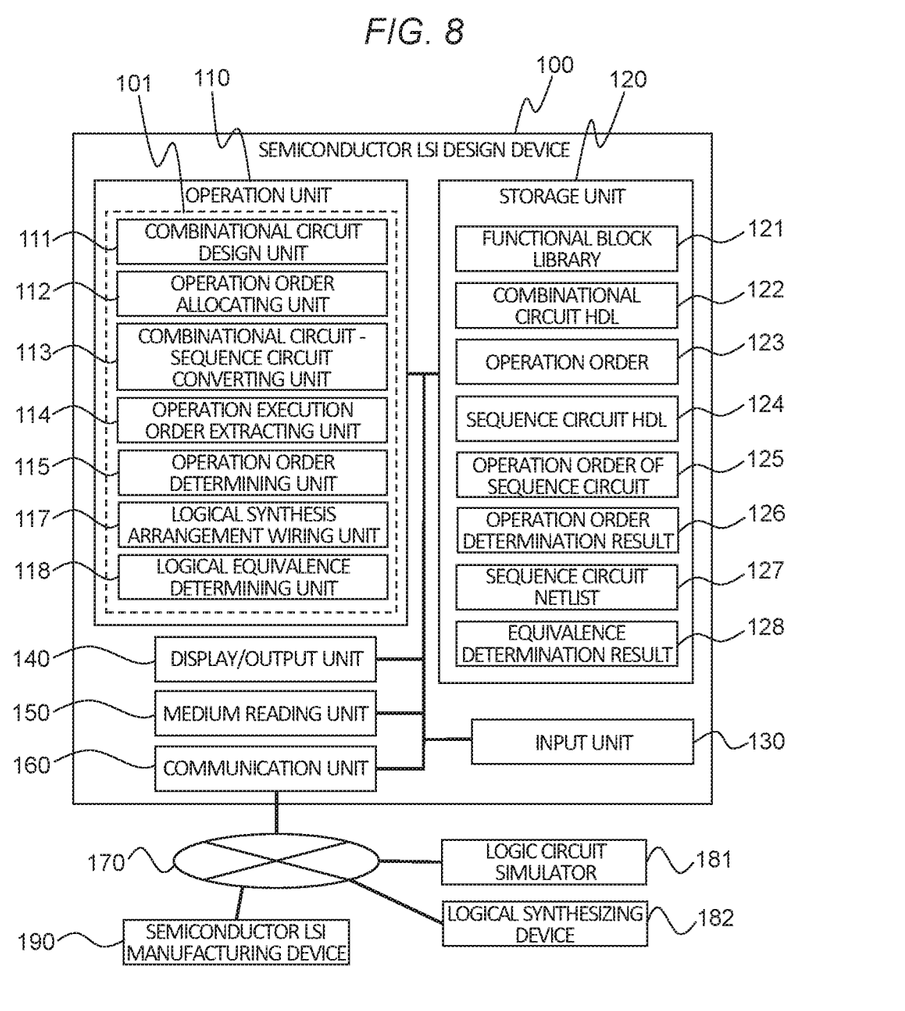
FIG. 8 is an example of a configuration diagram of a semiconductor LSI design device according to a third embodiment of the present invention.

FIG. 8 illustrates an example of a configuration diagram of a semiconductor LSI design device 100 according to the third embodiment. In a process of the logical synthesis arrangement wiring unit 117, the sequence circuit HDL 60 stored in the sequence circuit HDL storage region 124 is transmitted to a known logical synthesizing device 182 mounted in an external computer to entrust the logical synthesis process, and the sequence circuit netlist 91 of a processing result is received and stored in a sequence circuit netlist storage region 127. Alternatively, a configuration in which the logical synthesizing tool is mounted on the semiconductor LSI design device 100, and the logical synthesis arrangement wiring processing is executed in the operation unit 110 may be employed.

When an equivalence determination result 92 and the operation order determination result 80 are determined to be "equivalent," the sequence circuit netlist 91 stored in the sequence circuit netlist storage region 127 is transmitted to the semiconductor LSI manufacturing device 190 or the like, and it is mounted on an ASIC or an FPGA.

The present invention is not limited to the above embodiments but includes various modifications. For example, the above embodiments have been described in detail in order to help with understanding with the present invention and are not necessarily limited to a configuration including all the described components. Further, it is possible to replace some components of one embodiment with components of another embodiment, and it is possible to add components of another embodiment to components of one embodiment. Further, it is possible to perform addition, deletion, and replacement of components on some components of each embodiment. Furthermore, some or all of components, functions, processing units, processing devices, or the like described above may be implemented by hardware, for example, may be designed by an integrated circuit. Moreover, components, functions, or the like described above may be implemented by software by interpreting and executing a program for implementing the functions through a processor. Information such as programs, tables, or files for implementing functions may be stored in a recording device such as a memory, a hard disk, or an SSD or a recording medium such as an IC card, an SD card, or a DVD.

What is claimed is:

1. A semiconductor LSI design device, comprising:
   a central processing unit;
   a memory coupled to the central processing unit;
   wherein the central processing unit is programmed to
   generate a combinational circuit configured by combining functional blocks defined by a functional block library from an application specification;
   allocate an operation order of each functional block in the combinational circuit under a condition for starting an operation of a functional block connected to an input pin after ending the operation;
   convert the combinational circuit into a sequence circuit which uses the functional block twice or more in a time division manner, such that a number of functional blocks is reduced from the combinational circuit to the sequence circuit by a factor of 100 or more;
   extract the operation order at a time of execution of the sequence circuit; and
   determine whether the operation order allocated to the combinational circuit coincides with the extracted operation order;
   a user interface through which a user controls the semiconductor LSI design device; and
   a transceiver that communicates with a semiconductor manufacturing device that manufactures a semiconductor based on the sequence circuit, which is output by the transceiver.

2. The semiconductor LSI design device according to claim 1,
   wherein
   the sequence circuit includes:
   an operation order storage unit that stores the operation order generated by the unit that allocates the operation order of the functional block;
   a functional block group including functional blocks used in at least the combinational circuit connected in parallel, each functional block corresponding to each type;
   a memory that sequentially stores input data and operation results by the functional block;
   a memory control unit that reads data stored in the memory as an input to the functional block;
   an input selector that selects the read data as an input to the functional block group;
   an output selector that selects an operation result of the functional block group and storing the selected operation result in the memory; and
   an operation execution control unit that controls the memory control unit, the input selector, and the output selector in accordance with the operation order.

3. The semiconductor LSI design device according to claim 1,
wherein a functional block to be used is selected from the function block library in a sequence circuit HDL outputted from the memory.

4. The semiconductor LSI design device according to claim 1, wherein the central processing unit is further programmed to:
execute logical synthesis and arrangement wiring for mounting on an ASIC or an FPGA on a sequence circuit HDL outputted from the memory; and
determine logical equivalence of a sequence circuit netlist generated by executing the logical synthesis and the arrangement wiring on the sequence circuit HDL.

5. A semiconductor LSI design device, comprising:
a central processing unit;
a memory coupled to the central processing unit;
wherein the central processing unit is programmed to
generate a combinational circuit configured by combining functional blocks defined by a functional block library from an application specification;
allocate an operation order of each functional block in the combinational circuit under a condition for starting an operation of a functional block connected to an input pin after ending the operation;
convert the combinational circuit into a sequence circuit which uses the functional block twice or more in a time division manner, such that a number of functional blocks is reduced from the combinational circuit to the sequence circuit by a factor of 100 or more; and
determine equivalence between the combinational circuit and the sequence circuit;
a user interface through which a user controls the semiconductor LSI design device; and
a transceiver that communicates with a semiconductor manufacturing device that manufactures a semiconductor based on the sequence circuit, which is output by the transceiver.

6. The semiconductor LSI design device according to claim 5,
wherein the central processing unit applies a same input signal to the combinational circuit and the sequence circuit, compares output signals of the circuits after a certain time, and determines that the circuits are equivalent when comparison results for all input patterns coincide with each other.

7. A semiconductor LSI design method, comprising:
a step of generating a combinational circuit configured by combining functional blocks defined by a functional block library from an application specification;
a step of allocating an operation order of each functional block in the combinational circuit under a condition for starting an operation of a functional block connected to an input pin after ending the operation;
a step of converting the combinational circuit into a sequence circuit which uses the functional block twice or more in a time division manner, such that a number of functional blocks is reduced from the combinational circuit to the sequence circuit by a factor of 100 or more;
a step of extracting the operation order at a time of execution of the sequence circuit;
a step of determining whether the operation order allocated to the combinational circuit coincide with the extracted operation order; and
a step of communicating with a semiconductor manufacturing device that manufactures a semiconductor based on the sequence circuit.

8. The semiconductor LSI design method according to claim 7, further comprising,
a step of determining equivalence between the combinational circuit and the sequence circuit instead of the step of extracting the operation order at a time of execution of the sequence circuit and the step of determining whether the operation order allocated to the combinational circuit coincide with the extracted operation order.

9. The semiconductor LSI design method according to claim 7, further comprising,
a step of executing logical synthesis and arrangement wiring for mounting on an ASIC or a FPGA on a sequence circuit HDL output in the step of converting into the sequence circuit; and
a step of determining logical equivalence of a sequence circuit netlist generated by executing the logical synthesis and the arrangement wiring on the sequence circuit HDL.

* * * * *